(12) United States Patent
Gatta et al.

(10) Patent No.: US 8,396,276 B2
(45) Date of Patent: Mar. 12, 2013

(54) SYSTEMS AND METHODS FOR PERFORMING AN IMAGE-BASED GATING PROCEDURE DURING AN IVUS IMAGING PROCEDURE

(75) Inventors: Carlo Gatta, Barcelona (ES); Petia Ivanova Radeva, Barcelona (ES); Josepa Mauri Ferré, Barcelona (ES); Oriol Pujol Vila, Barcelona (ES); Oriol Rodriguez, Tiana (ES); David Rotger, Barcelona (ES); Eduardo Fernandez-Nofrerias, Barcelona (ES); Francesco Ciompi, Barcelona (ES)

(73) Assignee: Boston Scientific SciMed, Inc., Maple Grove, MN (US)

( * ) Notice: Subject to any disclaimer, the term of this patent is extended or adjusted under 35 U.S.C. 154(b) by 354 days.

(21) Appl. No.: 12/898,437

(22) Filed: Oct. 5, 2010

(65) Prior Publication Data

US 2011/0096972 A1  Apr. 28, 2011

Related U.S. Application Data

(60) Provisional application No. 61/254,971, filed on Oct. 26, 2009.

(51) Int. Cl.
*G06K 9/00* (2006.01)
(52) U.S. Cl. ......... 382/131; 382/128; 600/101; 600/437
(58) Field of Classification Search .................. None
See application file for complete search history.

(56) References Cited

U.S. PATENT DOCUMENTS

| | | | |
|---|---|---|---|
| 6,612,989 B1 * | 9/2003 | Brock-Fisher | 600/447 |
| 6,945,938 B2 | 9/2005 | Grunwald | |
| 7,306,561 B2 | 12/2007 | Sathyanarayana | |
| 8,077,926 B2 * | 12/2011 | Chen | 382/107 |
| 2006/0100522 A1 | 5/2006 | Yuan et al. | |
| 2006/0173350 A1 | 8/2006 | Yuan et al. | |
| 2006/0253028 A1 | 11/2006 | Lam et al. | |
| 2007/0016054 A1 | 1/2007 | Cao et al. | |
| 2007/0038111 A1 | 2/2007 | Rehrig et al. | |

OTHER PUBLICATIONS

Barajas, Joel, et al., "Cardiac Phase Extraction in IVUS Sequences using 1-D Gabor Filters," 1-4244-0788-5/07—IEEE; pp. 343-346.
De Winter, Sebastiaan, et al., "Retrospective Image-Based Gating of Intracoronary Ultrasound Images for Improved Quantitative Analysis: The Intelligate Method," Catheterization and Cardiovascular Interventions 61:84-94 (2004).

(Continued)

*Primary Examiner* — Bhavesh Mehta
*Assistant Examiner* — Shefali Goradia
(74) *Attorney, Agent, or Firm* — Frommer Lawrence & Haug LLP; Patrick R. Turner

(57) ABSTRACT

A method for imaging a patient using an intravascular ultrasound imaging system includes inserting a catheter into a target imaging region within patient vasculature. The catheter includes at least one transducer coupled to a control module. A plurality of image frames is generated as the at least one transducer is moved within patient vasculature. The image frames are based on data obtained from a plurality of echo signals reflected from patient tissue in response to a plurality of acoustic signals output from the at least one transducer. Each image frame includes a motion-blur component. A motion-blur-intensity estimate is quantified for each image frame to form a motion-blur-estimation signal that varies over time and that includes periodic local motion blur minima. Temporal variations of the motion-blur components are filtered to reduce variation in the motion-blur-intensity estimate arising from vessel structure variation. Image frames are selected that contain local motion blur minima.

20 Claims, 8 Drawing Sheets

OTHER PUBLICATIONS

Gatta, Carlo, "Robust image-based IVUS pullbacks gating," Computer Vision Center, Campus UAB, Edifici O, 08193, Bellaterra, Barcelona, Spain. *cgatta@cvc.uab.es*; pp. 1-8.

O'Malley, Sean M., et al., "Image-Based Frame Gating for Contrast-Enhanced IVUS Sequences," Computational Biomedicine Lab, Dept. of Computer Science, Univ. of Houston Association for Eradication of Heart Attack.

O'Malley, Sean M., et al., "Image-Based Frame Gating of IVUS Pullbacks: A Surrogate for ECG," 1-4244-0728-1/07—IEEE; pp. 433-436.

Zhu, Hui, et al., "Retrieval of Cardiac Phase from IVUS Sequences," Medical Imaging 2003: Ultrasonic Imaging and Signal Processing, Proceedings of SPIE, vol. 5035 (2003); pp. 135-146.

* cited by examiner

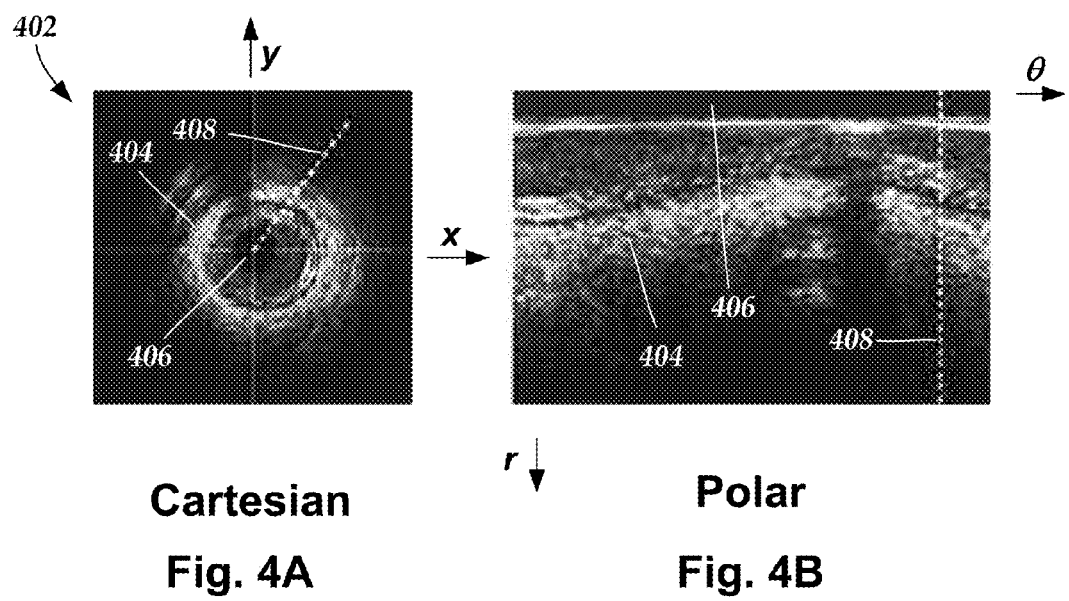
Cartesian
Fig. 4A
Polar
Fig. 4B
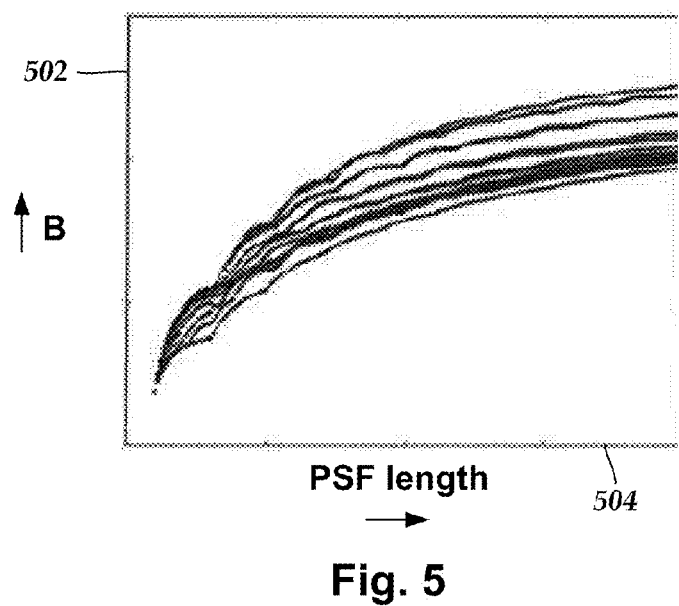
Fig. 5

SYSTEMS AND METHODS FOR PERFORMING AN IMAGE-BASED GATING PROCEDURE DURING AN IVUS IMAGING PROCEDURE

CROSS-REFERENCE TO RELATED APPLICATIONS

This application claims the benefit under 35 U.S.C. §119(e) of U.S. Provisional Patent Application Ser. No. 61/254,971 filed on Oct. 26, 2009, which is incorporated herein by reference.

TECHNICAL FIELD

The present invention is directed to the area of intravascular ultrasound imaging systems and methods of making and using the systems. The present invention is also directed to image-based gating procedures for reducing motion-related artifacts, as well as systems and methods for performing the image-based gating procedures and intravascular ultrasound imaging procedures.

BACKGROUND

Intravascular ultrasound ("IVUS") imaging systems have proven diagnostic capabilities for a variety of diseases and disorders. For example, IVUS imaging systems have been used as an imaging modality for diagnosing blocked blood vessels and providing information to aid medical practitioners in selecting and placing stents and other devices to restore or increase blood flow. IVUS imaging systems have been used to diagnose atheromatous plaque build-up at particular locations within blood vessels. IVUS imaging systems can be used to determine the existence of an intravascular obstruction or stenosis, as well as the nature and degree of the obstruction or stenosis. IVUS imaging systems can be used to visualize segments of a vascular system that may be difficult to visualize using other intravascular imaging techniques, such as angiography, due to, for example, movement (e.g., a beating heart) or obstruction by one or more structures (e.g., one or more blood vessels not desired to be imaged). IVUS imaging systems can be used to monitor or assess ongoing intravascular treatments, such as angiography and stent placement in real (or almost real) time. Moreover, IVUS imaging systems can be used to monitor one or more heart chambers.

IVUS imaging systems have been developed to provide a diagnostic tool for visualizing a variety of diseases or disorders. An IVUS imaging system can include, for example, a control module (with a pulse generator, an image processor, and a monitor), a catheter, and one or more transducers disposed in the catheter. The transducer-containing catheter can be positioned in a lumen or cavity within, or in proximity to, a region to be imaged, such as a blood vessel wall or patient tissue in proximity to a blood vessel wall. The pulse generator in the control module generates electrical pulses that are delivered to the one or more transducers and transformed to acoustic pulses that are transmitted through patient tissue. Reflected pulses of the transmitted acoustic pulses are absorbed by the one or more transducers and transformed to electric pulses. The transformed electric pulses are delivered to the image processor and converted to an image displayable on the monitor.

BRIEF SUMMARY

In one embodiment, a method for imaging a patient using an intravascular ultrasound imaging system includes inserting a catheter into a target imaging region within patient vasculature. The catheter includes at least one transducer disposed in a distal portion of a lumen defined in the catheter. The at least one transducer is coupled to a control module by at least one conductor. A plurality of image frames is generated as the at least one transducer is moved within patient vasculature. The image frames are based on data obtained from a plurality of echo signals reflected from patient tissue in response to a plurality of acoustic signals output from the at least one transducer. Each image frame includes a motion-blur component arising from relative movement between the at least one transducer and surrounding patient tissue. A motion-blur-intensity estimate is quantified for each image frame to form a motion-blur-estimation signal that varies over time and that includes periodic local motion blur minima. Temporal variations of the motion-blur components are filtered to reduce variation in the motion-blur-intensity estimate arising from vessel structure variation. Image frames are selected that contain local motion blur minima.

In another embodiment, a computer-readable medium includes processor-executable instructions for reducing image artifacts present in a composite intravascular ultrasound image formed from a plurality of image frames by selectively using image frames with relatively low amounts of motion blur. The processor-executable instructions, when installed onto a device, enable the device to perform actions, including generating a plurality of image frames as the at least one transducer is moved within patient vasculature. The image frames are based on data obtained from a plurality of echo signals reflected from patient tissue in response to a plurality of acoustic signals output from the at least one transducer. Each image frame includes a motion-blur component arising from relative movement between the at least one transducer and surrounding patient tissue. A motion-blur-intensity estimate is quantified for each image frame to form a motion-blur-estimation signal that varies over time and that includes periodic local motion blur minima. Temporal variations of the motion-blur components are filtered to reduce variation in the motion-blur-intensity estimate arising from vessel structure variation. Image frames are selected that contain local motion blur minima.

In yet another embodiment, a catheter-based intravascular ultrasound imaging system includes at least one imager and a processor. The at least one imager is disposed in a catheter at least partially insertable into a patient blood vessel. The at least one imager is coupled to a control module. The processor is in communication with the control module. The processor executes processor-readable instructions that enable actions, including generating a plurality of image frames as the at least one imager is moved within patient vasculature. The image frames are based on data obtained from a plurality of echo signals reflected from patient tissue in response to a plurality of acoustic signals output from the at least one imager. Each image frame includes a motion-blur component arising from relative movement between the at least one imager and surrounding patient tissue. A motion-blur-intensity estimate is quantified for each image frame to form a motion-blur-estimation signal that varies over time and that includes periodic local motion blur minima. Temporal variations of the motion-blur components are filtered to reduce variation in the motion-blur-intensity estimate arising from vessel structure variation. Image frames are selected that contain local motion blur minima.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 4A is a schematic view of one embodiment of a composite IVUS image of patient tissue surrounding a lumen of a blood vessel, the composite IVUS image shown in Cartesian format, according to the invention;

FIG. 4B is a schematic view of one embodiment of a composite IVUS image of the patient tissue surrounding the lumen of the blood vessel of FIG. 4A, the composite IVUS image transformed into polar format, according to the invention;

FIG. 5 is a graph showing one embodiment of a relationship between a motion blur intensity estimator (B) and a point spread function length, according to the invention;

DETAILED DESCRIPTION

Figure 1:
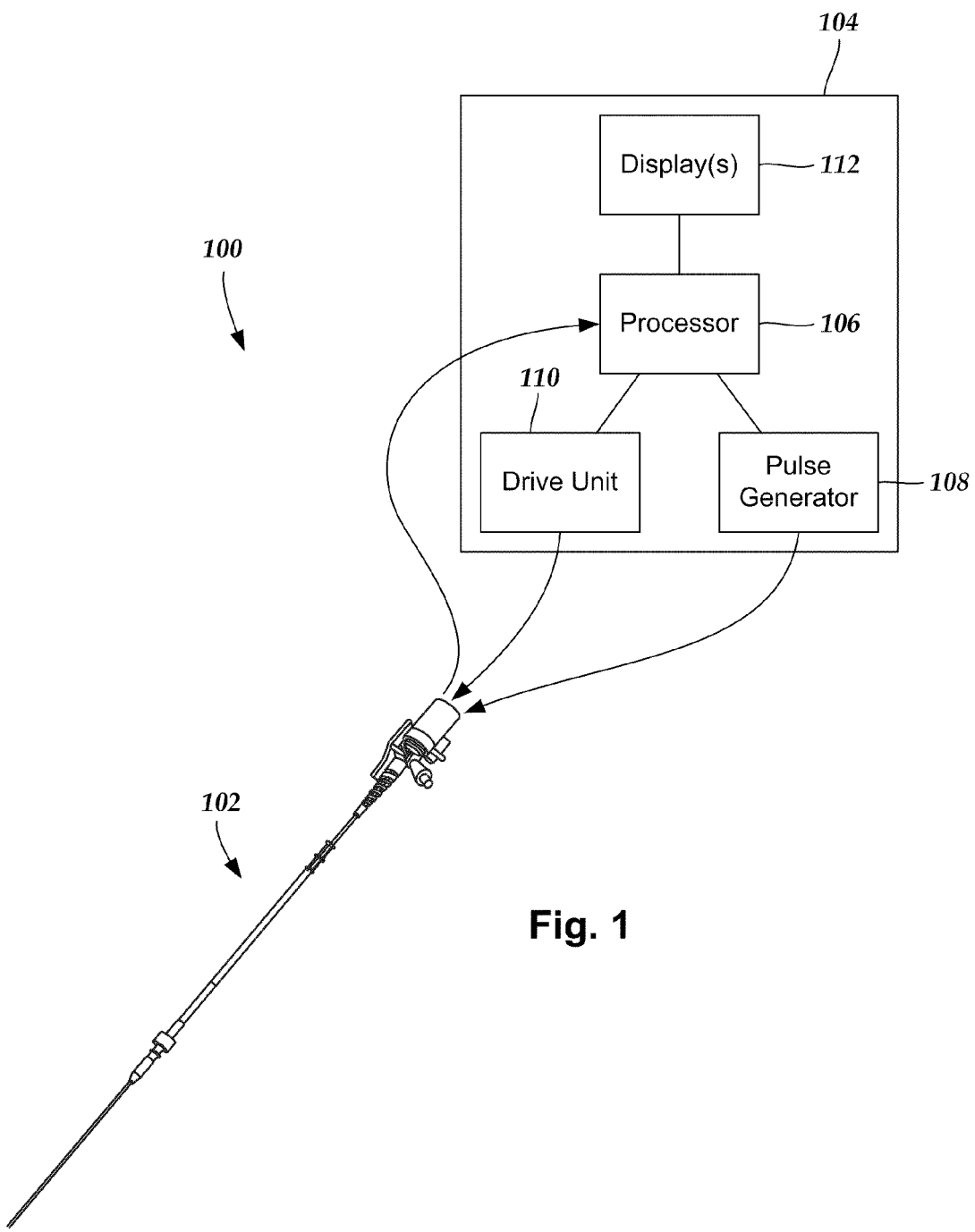
FIG. 1 is a schematic view of one embodiment of an intravascular ultrasound imaging system, according to the invention.

The present invention is directed to the area of intravascular ultrasound imaging systems and methods of making and using the systems. The present invention is also directed to image-based gating procedures for reducing motion-related artifacts, as well as systems and methods for performing the image-based gating procedures and intravascular ultrasound imaging procedures.

The methods, systems, and devices described herein may be embodied in many different forms and should not be construed as limited to the embodiments set forth herein. Accordingly, the methods, systems, and devices, or portions thereof, described herein may take the form of an entirely hardware embodiment, an entirely software embodiment or an embodiment combining software and hardware aspects. Many of the steps of the methods described herein can be performed using any type of computing device, such as a computer, that includes a processor or any combination of computing devices where each device performs at least part of the process.

Suitable computing devices typically include mass memory and typically include communication between devices. The mass memory illustrates a type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory, or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computing device.

Methods of communication between devices or components of a system can include both wired and wireless (e.g., RF, optical, or infrared) communications methods and such methods provide another type of computer readable media; namely communication media. Communication media typically embodies computer-readable instructions, data structures, program modules, or other data in a modulated data signal such as a carrier wave, data signal, or other transport mechanism and include any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Suitable intravascular ultrasound ("IVUS") imaging systems include, but are not limited to, one or more transducers disposed on a distal end of a catheter configured and arranged for percutaneous insertion into a patient. Examples of IVUS imaging systems with catheters are found in, for example, U.S. Pat. Nos. 7,306,561; and 6,945,938; as well as U.S. Patent Application Publication Nos. 20060253028; 20070016054; 20070038111; 20060173350; and 20060100522, all of which are incorporated by reference.

FIG. 1 illustrates schematically one embodiment of an IVUS imaging system 100. The IVUS imaging system 100 includes a catheter 102 that is coupleable to a control module 104. The control module 104 may include, for example, a processor 106, a pulse generator 108, a drive unit 110, and one or more displays 112. In at least some embodiments, the pulse generator 108 forms electric pulses that may be input to one or more transducers (312 in FIG. 3) disposed in the catheter 102. In at least some embodiments, mechanical energy from the drive unit 110 may be used to drive an imaging core (306 in FIG. 3) disposed in the catheter 102. In at least some embodiments, electric pulses transmitted from the one or more transducers (312 in FIG. 3) may be input to the processor 106 for processing. In at least some embodiments, the processed electric pulses from the one or more transducers (312 in FIG. 3) may be displayed as one or more images on the one or more displays 112. In at least some embodiments, the processor 106 may also be used to control the functioning of one or more of the other components of the control module 104. For example, the processor 106 may be used to control at least one of the frequency or duration of the electrical pulses transmitted from the pulse generator 108, the rotation rate of the imaging core (306 in FIG. 3) by the drive unit 110, the velocity or length of the pullback of the imaging core (306 in FIG. 3) by the drive unit 110, or one or more properties of one or more images formed on the one or more displays 112.

Figure 2:
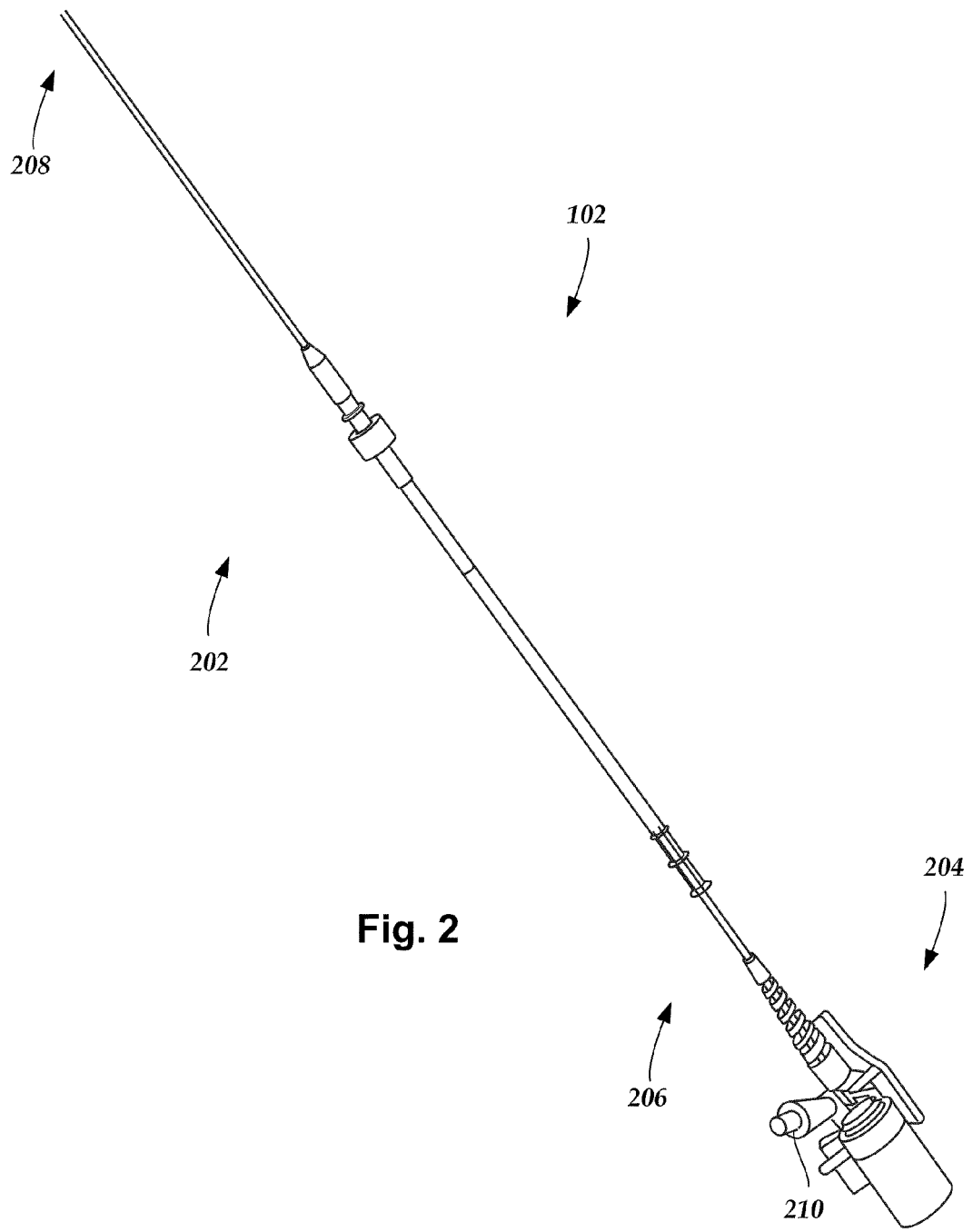
FIG. 2 is a schematic side view of one embodiment of a catheter of an intravascular ultrasound imaging system, according to the invention.

FIG. 2 is a schematic side view of one embodiment of the catheter 102 of the IVUS imaging system (100 in FIG. 1). The catheter 102 includes an elongated member 202 and a hub 204. The elongated member 202 includes a proximal end 206 and a distal end 208. In FIG. 2, the proximal end 206 of the elongated member 202 is coupled to the catheter hub 204 and the distal end 208 of the elongated member is configured and arranged for percutaneous insertion into a patient. In at least some embodiments, the catheter 102 defines at least one flush port, such as flush port 210. In at least some embodiments, the flush port 210 is defined in the hub 204. In at least some embodiments, the hub 204 is configured and arranged to couple to the control module (104 in FIG. 1). In some embodiments, the elongated member 202 and the hub 204 are formed as a unitary body. In other embodiments, the elongated member 202 and the catheter hub 204 are formed separately and subsequently assembled together.

Figure 3:
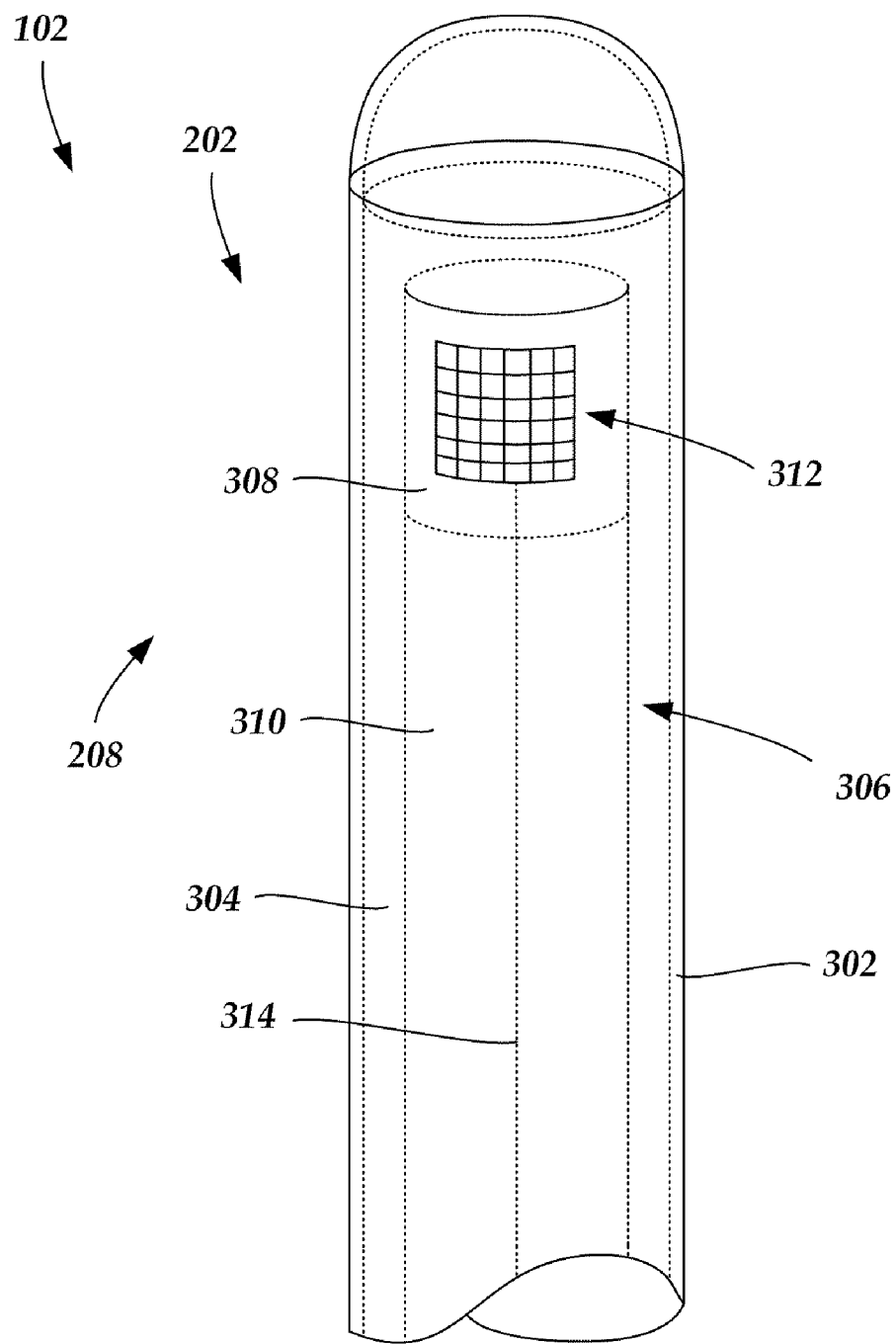
FIG. 3 is a schematic perspective view of one embodiment of a distal end of the catheter shown in FIG. 2 with an imaging core disposed in a lumen defined in the catheter, according to the invention.

FIG. 3 is a schematic perspective view of one embodiment of the distal end 208 of the elongated member 202 of the catheter 102. The elongated member 202 includes a sheath 302 and a lumen 304. An imaging core 306 is disposed in the lumen 304. The imaging core 306 includes an imaging device 308 coupled to a distal end of a drive cable 310.

The sheath 302 may be formed from any flexible, biocompatible material suitable for insertion into a patient. Examples of suitable materials include, for example, polyethylene, polyurethane, plastic, spiral-cut stainless steel, nitinol hypotube, and the like or combinations thereof.

One or more transducers 312 may be mounted to the imaging device 308 and employed to transmit and receive acoustic signals. In a preferred embodiment (as shown in FIG. 3), an array of transducers 312 are mounted to the imaging device 308. In other embodiments, a single transducer may be employed. In yet other embodiments, multiple transducers in an irregular-array may be employed. Any number of transducers 312 can be used. For example, there can be one, two, three, four, five, six, seven, eight, nine, ten, twelve, fifteen, sixteen, twenty, twenty-five, fifty, one hundred, five hundred, one thousand, or more transducers. As will be recognized, other numbers of transducers may also be used.

The one or more transducers 312 may be formed from one or more known materials capable of transforming applied electrical pulses to pressure distortions on the surface of the one or more transducers 312, and vice versa. Examples of suitable materials include piezoelectric ceramic materials, piezocomposite materials, piezoelectric plastics, barium titanates, lead zirconate titanates, lead metaniobates, polyvinylidenefluorides, and the like.

The pressure distortions on the surface of the one or more transducers 312 form acoustic pulses of a frequency based on the resonant frequencies of the one or more transducers 312. The resonant frequencies of the one or more transducers 312 may be affected by the size, shape, and material used to form the one or more transducers 312. The one or more transducers 312 may be formed in any shape suitable for positioning within the catheter 102 and for propagating acoustic pulses of a desired frequency in one or more selected directions. For example, transducers may be disc-shaped, block-shaped, rectangular-shaped, oval-shaped, and the like. The one or more transducers may be formed in the desired shape by any process including, for example, dicing, dice and fill, machining, microfabrication, and the like.

As an example, each of the one or more transducers 312 may include a layer of piezoelectric material sandwiched between a conductive acoustic lens and a conductive backing material formed from an acoustically absorbent material (e.g., an epoxy substrate with tungsten particles). During operation, the piezoelectric layer may be electrically excited by both the backing material and the acoustic lens to cause the emission of acoustic pulses.

In at least some embodiments, the one or more transducers 312 can be used to form a radial cross-sectional image of a surrounding space. Thus, for example, when the one or more transducers 312 are disposed in the catheter 102 and inserted into a blood vessel of a patient, the one more transducers 312 may be used to form a composite image of the walls of the blood vessel and tissue surrounding the blood vessel by stitching together a plurality of individual image frames.

In at least some embodiments, the imaging core 306 may be rotated about a longitudinal axis of the catheter 102. As the imaging core 306 rotates, the one or more transducers 312 emit acoustic pulses in different radial directions. When an emitted acoustic signal with sufficient energy encounters one or more medium boundaries, such as one or more tissue boundaries, a portion of the emitted acoustic signal is reflected back to the emitting transducer as an echo signal. Each echo signal that reaches a transducer with sufficient energy to be detected is transformed to an electrical signal in the receiving transducer. The one or more transformed electrical signals are transmitted to the control module (104 in FIG. 1) where the processor 106 processes the electrical-signal characteristics to generate a displayable image frame of the imaged region based, at least in part, on a collection of information from each of the acoustic signals transmitted and the echo signals received. In at least some embodiments, the rotation of the imaging core 306 is driven by the drive unit 110 disposed in the control module (104 in FIG. 1) via the drive cable 310.

As the one or more transducers 312 rotate about the longitudinal axis of the catheter 102 emitting acoustic signals, a plurality of image frames are formed that collectively form a composite radial cross-sectional image of a portion of the region surrounding the one or more transducers 312, such as the walls of a blood vessel of interest and the tissue surrounding the blood vessel. In at least some embodiments, the radial cross-sectional composite image can be displayed on the one or more displays 112.

In at least some embodiments, the imaging core 306 may also move longitudinally along the blood vessel within which the catheter 102 is inserted so that a plurality of composite cross-sectional images may be formed into one or more larger composite images that include an axial length of the blood vessel. In at least some embodiments, during an imaging procedure the one or more transducers 312 may be retracted (i.e., pulled back) along the longitudinal length of the catheter 102. In at least some embodiments, the catheter 102 includes at least one telescoping section that can be retracted during pullback of the one or more transducers 312. In at least some embodiments, the drive unit 110 drives the pullback of the imaging core 306 within the catheter 102. In at least some embodiments, the drive unit 110 pullback distance of the imaging core is at least 5 cm. In at least some embodiments, the drive unit 110 pullback distance of the imaging core is at least 10 cm. In at least some embodiments, the drive unit 110 pullback distance of the imaging core is at least 15 cm. In at least some embodiments, the drive unit 110 pullback distance of the imaging core is at least 20 cm. In at least some embodiments, the drive unit 110 pullback distance of the imaging core is at least 25 cm.

The quality of imaging at different depths from the one or more transducers 312 may be affected by one or more factors including, for example, bandwidth, transducer focus, beam pattern, as well as the frequency of the acoustic pulse. The frequency of the acoustic pulse output from the one or more transducers 312 may also affect the penetration depth of the acoustic pulse output from the one or more transducers 312. In general, as the frequency of an acoustic pulse is lowered, the depth of the penetration of the acoustic pulse within patient tissue increases. In at least some embodiments, the IVUS imaging system 100 operates within a frequency range of 5 MHz to 60 MHz.

In at least some embodiments, one or more transducer conductors 314 electrically couple the transducers 312 to the control module 104 (See FIG. 1). In at least some embodiments, the one or more transducer conductors 314 extend along the drive cable 310.

In at least some embodiments, one or more transducers 312 may be mounted to the distal end 208 of the imaging core 308. The imaging core 308 may be inserted in the lumen of the catheter 102. In at least some embodiments, the catheter 102 (and imaging core 308) may be inserted percutaneously into a patient via an accessible blood vessel, such as the femoral artery, at a site remote from a target imaging location. The catheter 102 may then be advanced through patient vasculature to the target imaging location, such as a portion of a selected blood vessel.

An image frame ("frame") of a composite image can be generated each time one or more acoustic signals are output to surrounding tissue and one or more corresponding echo signals are received by the imager 308 and transmitted to the processor 106. A plurality of frames may be acquired over time during any type of movement of the imaging device 308. For example, the frames can be acquired during rotation and pullback of the imaging device 308 along the target imaging location. It will be understood that frames may be acquired both with or without rotation and with or without pullback of the imaging device 308. Moreover, it will be understood that frames may be acquired using other types of movement procedures in addition to, or in lieu of, at least one of rotation or pullback of the imaging device 308.

In at least some embodiments, when pullback is performed, the pullback may be at a constant rate, thus providing a tool for potential applications able to compute longitudinal vessel/plaque measurements. In at least some embodiments, the imaging device 308 is pulled back at a constant rate of at least 0.3 mm/s. In at least some embodiments, the imaging device 308 is pulled back at a constant rate of at least 0.4 mm/s. In at least some embodiments, the imaging device 308 is pulled back at a constant rate of at least 0.5 mm/s. In at least some embodiments, the imaging device 308 is pulled back at a constant rate of at least 0.6 mm/s. In at least some embodiments, the imaging device 308 is pulled back at a constant rate of at least 0.7 mm/s. In at least some embodiments, the imaging device 308 is pulled back at a constant rate of at least 0.8 mm/s.

In at least some embodiments, the one or more acoustic signals are output to surrounding tissue at constant intervals of time. In at least some embodiments, the one or more corresponding echo signals are received by the imager 308 and transmitted to the processor 106 at constant intervals of time. In at least some embodiments, the resulting frames are generated at constant intervals of time.

During pullback, or other movement of the imaging device 308, the imaging device 308 moves relative to the blood vessel within which the imaging device 308 is positioned. Other, undesirable relative movements between the imaging device 308 and patient tissue may also occur during pullback (or other procedure). The size or shape of a blood vessel being imaged may change one or more times during pullback (or other procedure) due to, for example, patient breathing, variable amounts of blood moving through the blood vessel during different portions of repeating patient cardiac cycles, or the like. The shifting size and shape of the blood vessel being imaged may, over time, cause one or more deleterious effects (e.g., the positioning or orientation of the imaging device 308 may shift in relation to the blood vessel, the rate of movement of the imaging device 308 may be affected by surging blood flow or patient breathing or both, the relative location or size of the vessel walls may be altered, or the like). As a result, when the generated frames are stitched together to form a composite image, the composite image may include one or more motion artifacts (e.g., one or more frames may appear blurry, include one or more distorted regions, or the like).

One way to reduce artifacts is to sample, or gate, frames according to the occurrence of an event that occurs in regular intervals such that the generated frames used to form the composite image correspond to moments of reduced relative movement between the imaging device 308 and the blood vessel being imaged. For example, frames may be gated based on the cardiac cycle using an electrocardiogram, or the like, to indicate the timing of mechanical activity of the heart. For example, the frames may correspond to the end-diastolic point of the cardiac cycle. Sampling frames based on the patient's cardiac cycle, however, may increase the amount of time for completing pullback (or other procedures) since the gating is performed by waiting for the appropriate instant, which is dependent on the patient's heart rate.

Another technique for gating frames based on the patient's cardiac cycle involves performing a motorized pullback (or other movement of the imaging device 308) while performing an electrocardiogram on the patient, and then performing the gating after pullback (or other procedure) is completed. This technique may reduce the duration of the pullback (or other procedure). Sub-optimal frames, however, may be generated because the frame rate is fixed. Thus, gating is performed only at discretized instants.

Moreover, selection of a sampling instant based on the patient's cardiac cycle may be difficult due to inter- and intra-patient variability. Additionally, an electrocardiogram signal is a global measurement of the heart electrical activity. The timing of the relative movement between the imaging device 308 and a blood vessel at a target imaging location may be temporally offset from the timing of the cardiac cycle.

The amount of motion blur contained on a given frame may correspond, at least in part, to the amount of relative movement between the imaging device 308 and the blood vessel within which the imaging device 308 is positioned at a moment in time. Thus, frames with reduced motion blur may correspond to periods of reduced relative movement between the imaging device 308 and the blood vessel within which the imaging device 308 is positioned. Accordingly, artifacts appearing on a composite image may be reduced by gating frames such that frames used to form the composite image correspond to periods of reduced motion blur.

Periods of reduced relative movement may be determined by comparing the amount of motion blur present on one or more individual frames. An image-based gating procedure includes performing a motion blur analysis on at least some of frames. In at least some embodiments, motion blur is analyzed in each frame generated during pullback, or some other procedure. An estimate of the intensity of the motion blur for each generated frame is quantified to form a motion-blur-estimation signal that varies over time. In at least some embodiments, motion blur intensity is estimated using an average gradient magnitude of a composite image. In at least some embodiments, the temporal variation of the motion-blur-estimation signal is filtered to separate motion blur caused by pullback (or other procedure) from motion blur caused by the patient's heart beat, or breathing, or the like. In at least some embodiments, one or more frames from each cardiac cycle that include local motion blur minima are identified. In at least some embodiments, when pullback (or other procedure) is performed at a constant rate of speed, the relative positioning of each of the local motion blur minima from each cardiac cycle may be estimated by multiplying the temporal interval between the most stable frame(s) by the rate of pullback (or other procedure). In at least some embodiments, a composite image is formed from the identified local motion blur minima from each cardiac cycle. In at least some embodiments, the composite image is displayed on the display 112.

During an imaging procedure, the processor 106 may form a composite image of frames in one or more different formats including, for example, Cartesian format. In at least some embodiments, the composite image may be displayed on the one or more displays 112. FIG. 4A is a schematic view of one embodiment of a composite IVUS image 402 of patient tissue 404 surrounding a lumen 406 of a blood vessel shown in Cartesian format. An A-line 408 is shown in FIG. 4A extending from a center of the lumen 406 along a given angle. In at least some embodiments, the A-line 408 represents a frame.

In at least some embodiments, the processor 106 may transform the composite image from Cartesian format to polar format. FIG. 4B is a schematic view of one embodiments of a composite IVUS image 420 of the patient tissue 404 surrounding the lumen 406 of the blood vessel of FIG. 4A in polar format. The A-line 408 is shown extending along an angle corresponding to the same angle shown in FIG. 4A.

An estimate of the intensity of the motion blur for each generated frame may be quantified to form a motion-blur-estimation signal that varies over time. In at least some embodiments, intensity of motion blur is quantified using data from frames in polar format. Intensity of motion blur for each frame may be quantified, as follow:

$$B(I_t) = -\mu\left(\left|\frac{\partial I_t(r, \theta)}{\partial r}\right|\right); \quad (1)$$

where $I_t$ is a polar image at time t, r is the radial distance of patient tissue from the one or more A-lines 408, and θ is the angle of the one or more transducers during the imaging procedure. In at least some embodiments, the estimation may be averaged (using the average operator μ) over the entire image in order to reduce the effect(s) of one or more outliers. The operator μ is the standard average, or mean, operator, i.e.,
the sum of element values over the number of elements. In at least some embodiments, intensity of motion blur is quantified directly from frames in Cartesian format.

Equation (1) measures the average absolute intensity of the gradient in the direction of the A-line 408 (e.g., one of the frames). If motion blur is present, the average magnitude of a given gradient (B) is reduced. To confirm this, synthetic motion blur with increasing intensity by means of a point spread function ("PSF") of increasing length may be added to various frames, and applied to equation (1). FIG. 5 is a graph showing one embodiment of a relationship between the motion blur intensity estimator (B) 502 and PSF length 504. As shown in FIG. 5, when PSF length 504 increases, the absolute value of (B) 502 decreases.

As shown in FIG. 5, the motion blur intensity estimator B 502 quantifies motion blur in relation to PSF length 504. Applying equation (1) to a plurality of frames generated during pullback, a signal may be obtained where local motion blur minima represent frames of reduced motion blur (as compared to nearby frames), and thus, of local increased relative stability (as compared to nearby frames) between the imaging device 308 and the blood vessel being imaged.

Figure 6A:
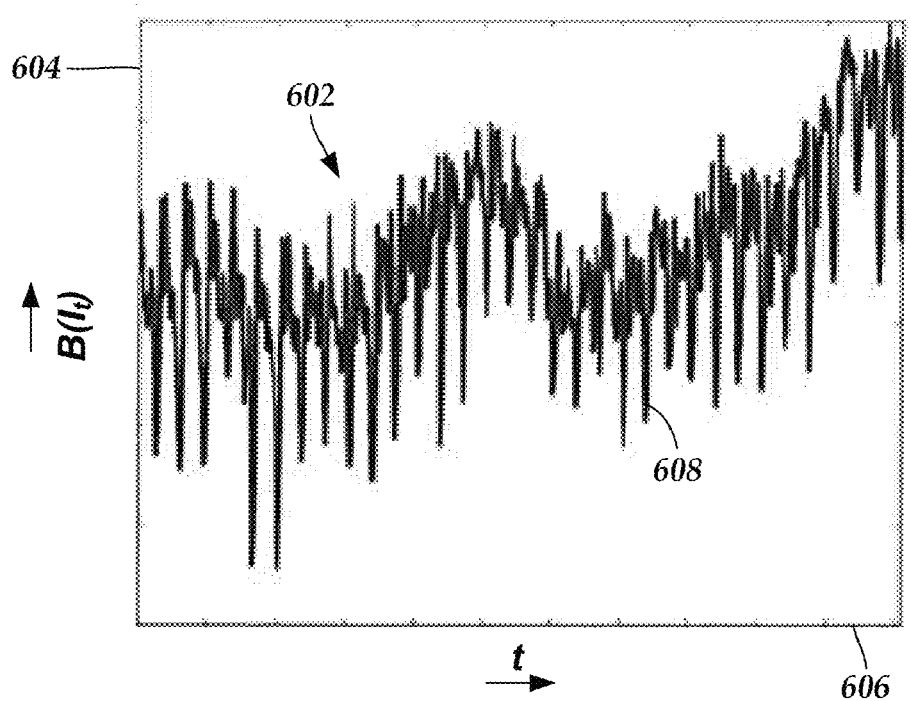
FIG. 6A is a graph showing one embodiment of a motion-blur-estimator signal formed using data from a plurality of image frames generated from echo signals received during pullback, according to the invention.

FIG. 6A is a graph showing one embodiment of a motion blur estimator signal $B(I_t)$ 602 obtained for a plurality of frames generated from an imaging-device pullback (or other procedure). In at least some embodiments, the motion blur estimator signal $B(I_t)$ 602 is formed by applying equation (1) to a plurality of frames. The motion blur estimator signal $B(I_t)$ 602 shows the intensity of motion blur 604 for each frame over a period of time 606. In at least some embodiments, the period of time 606 is equal to the period of time of the imaging-device pullback (or other procedure). The motion blur estimator signal $B(I_t)$ 602 includes a plurality of local motion blur minima, such as local motion blur minimum 608. In at least some embodiments, the local motion blur minima 608 occur at regular intervals. For example, the local motion blur minima 608 may correspond to a regularly occurring phenomenon (e.g., a heartbeat, a breath, or the like).

In addition to the series of local minima occurring at regular intervals, the motion blur estimator signal $B(I_t)$ 602 may also include a variation that occurs at a lower frequency, that may be due to imaging-device pullback, or some other slowly varying phenomenon. These lower frequency variations, however, are generally slower than changes caused by the patient's cardiac cycle, or the like, because the imaging device 308 is typically pulled back at a rate of speed that causes relative movement between the imaging device 308 and the imaged blood vessel to occur at a rate that is much slower than relative movement between the imaging device 308 and the imaged blood vessel caused by, for example, a heart beat.

In at least some embodiments, the local motion blur minima of the motion blur estimator signal $B(I_t)$ 602 occurring at regular intervals can be separated from the local motion blur minima caused by, vessel structure variation during the constant low speed movement of the imaging device 308 during pullback (or other procedure). In at least some embodiments, the two types of local blur minima can be separated from one another by filtering the motion blur estimator signal $B(I_t)$ 602. In at least some embodiments, the motion blur estimator signal $B(I_t)$ 602 is passed through a filter (e.g., a high-pass filter or a band-pass filter). For example, in at least some embodiments, a Butterworth high-pass filter (order=10) may be used with a cut-off at a frequency corresponding to the pullback rate.

In at least some embodiments, the cut-off may be set at 0.6 Hz. In at least some embodiments, the cut-off may be set at 0.5 Hz. In at least some embodiments, the cut-off may be set at 0.4 Hz. In at least some embodiments, the cut-off may be set at 0.3 Hz. In at least some embodiments, the cut-off may be set at 0.2 Hz.

Figure 6B:
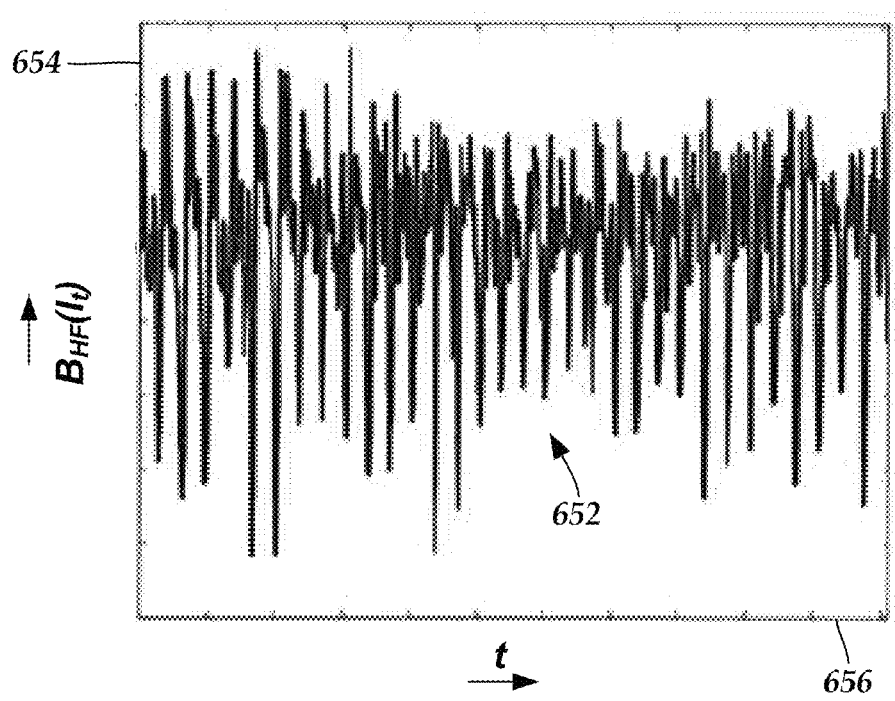
FIG. 6B is a graph showing one embodiment of a filtered version of the motion-blur-estimator signal of FIG. 6A, according to the invention.

FIG. 6B is a graph showing one embodiment of a filtered motion blur estimator signal $B_{HP}(I_t)$ 652 showing the intensity of motion blur 654 of frames generated during pullback (or other procedure) over the period of time 656. Without wishing to be held to any particular values, the filtered motion blur estimator signal $B_{HP}(I_t)$ 652 is obtained when a Butterworth high-pass filter (order=10) is employed with a cut-off at a frequency of 0.5 Hz. In FIG. 6B, an oscillation below 0.5 Hz represents a heart rate that is lower than 30 beats per minute and, therefore, is unlikely to be caused by a patient heart beat.

High-pass filtering does not impose periodicity to the filtered motion-blur-estimator signal $B_{HP}(I_t)$ 652. Accordingly, it may be an added advantage to employ high-pass filtering image-based gating procedures for patients with irregular heart beats because high-pass filtering is not dependent on the patient having a regular heart beat.

Figure 7:
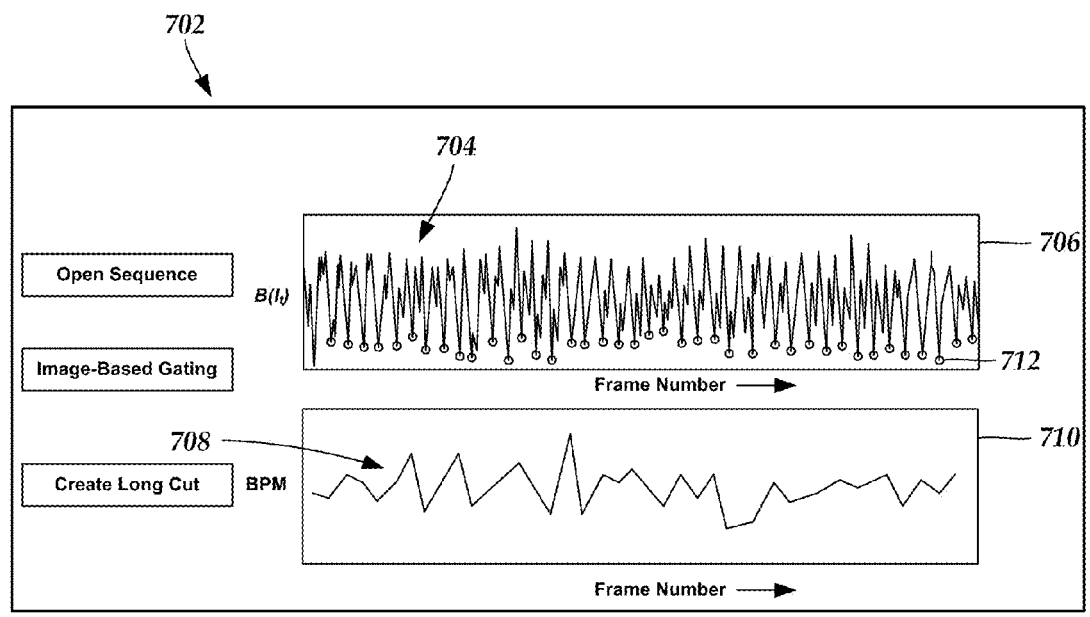
FIG. 7 is a schematic view of one embodiment of an exemplary screenshot that includes a motion-blur-intensity signal and an estimated patient heart rate in beats per minute, the motion-blur-intensity signal including local motion blur minima that correspond with the estimated patient heat rate, according to the invention.

FIG. 7 is a schematic view of one embodiment of an exemplary screenshot 702. The screenshot 702 includes a motion blur estimator signal 704 in a first field 706 and an estimated patient heart rate 708 in beats per minute ("BPM") in a second field 710. The motion blur estimator signal 704 is based on data from a plurality of frames corresponding to pullback (or other procedure) of the imaging device 308. Circles, such as circle 712, are positioned over selected local minima of the motion blur estimator signal 704. In at least some embodiments, the estimated heart rate 708 is computed as the inverse of the distances between frames. As shown in FIG. 7, the selected local minima of the motion blur estimator signal 704 correspond (with slight variation) to the frequency of the patient's estimated heart rate. In the example shown in FIG. 7, the frequency of the patient's heart beat is 1.29 Hz; or 77 BPM.

In at least some embodiments, a composite image may be formed from the one or more frames of each cardiac cycle containing local motion blur minima. In at least some embodiments, when pullback (or other procedure) is performed at a constant rate of speed, the relative positioning of each frame containing a local motion blur minimum can be estimated by multiplying the temporal interval between those frames by the rate of pullback (or other procedure). The position of a given frame is:

$$\Delta x = st + \epsilon;$$

where s is the pullback (or other procedure) speed, t is the temporal delay between two frames, and $\epsilon$ represents an error. Theoretically, the error is expected to be relatively small because the instant of reduced motion is not affected by movement of the blood vessel and the imaging device 308.

Figures 8A, 8B:
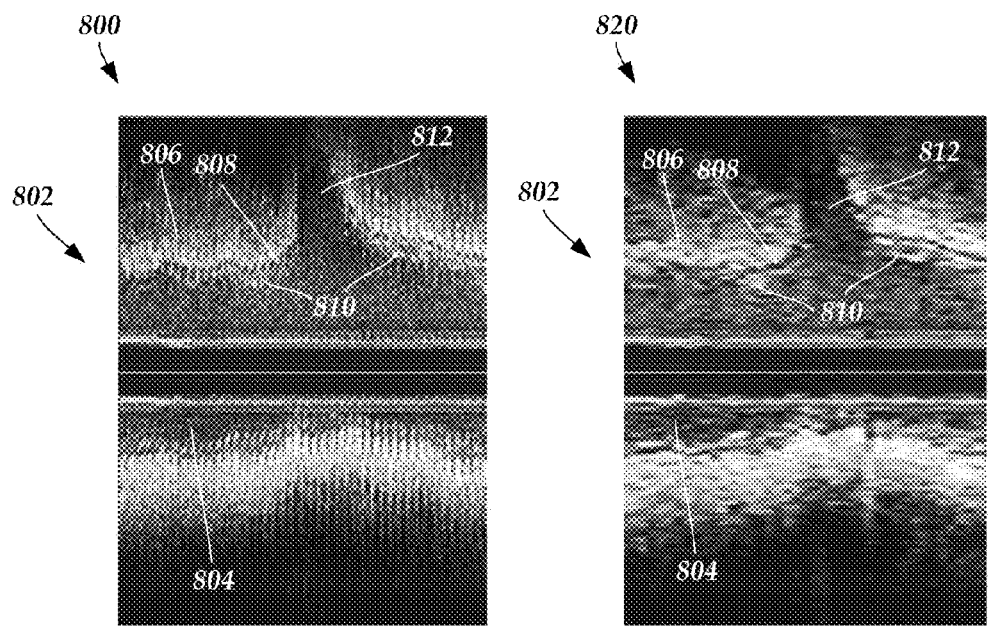
FIG. 8A shows a schematic longitudinal cross-sectional view of one embodiment of a composite image of a portion of a blood vessel imaged using an intravascular ultrasound imaging system, according to the invention.
FIG. 8B shows a schematic longitudinal cross-sectional view of one embodiment of the composite image of FIG. 8A after performing an image-based gating procedure, according to the invention.

FIG. 8A shows a schematic longitudinal cross-sectional view of one embodiment of a composite image 800 of a portion of a blood vessel 802 imaged using an intravascular ultrasound imaging system before employing an image-based gating procedure. FIG. 8B shows a schematic longitudinal cross-sectional view of one embodiment of a composite image 820 of the portion of the blood vessel 802 after employing an image-based gating procedure. The blood vessel 802 includes a lumen 804 and an adventitia 806 having an inner border 808. Plaque 810 is disposed on both sides of a bifurcation 812.

A comparison of the composite images 800 and 820 in FIGS. 8A and 8B, respectively, reveals that the image-based gating procedure reduces artifacts that may be present in the composite image 800 of the blood vessel 802 and that may make structures within the image 800 less visible. For example, the inner border 808 of the adventitia 806 is more visible in FIG. 8B than in FIG. 8A. Additionally, the plaque 810 is also more visible in FIG. 8B than in FIG. 8A. The improved visibility of the inner border 808 of the adventitia 806 and the plaque 810 may be due to the reduction of artifacts through the image-based gating procedure.

Figures 9A, 9B:
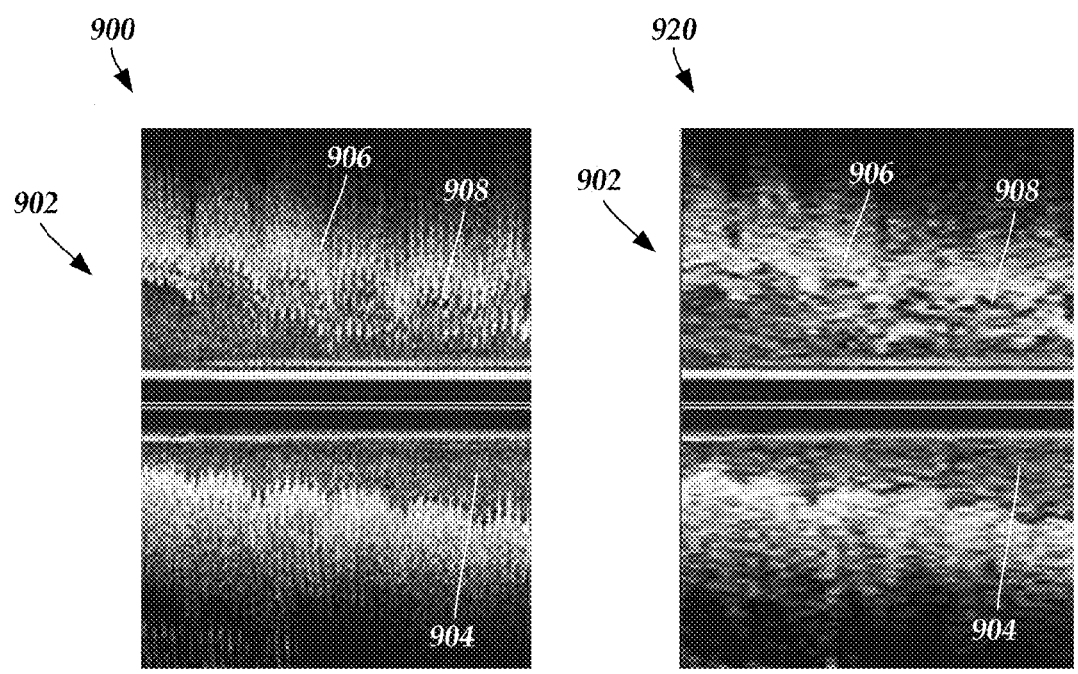
FIG. 9A shows a schematic longitudinal cross-sectional view of another embodiment of a composite image of a portion of a blood vessel imaged using an intravascular ultrasound imaging system, according to the invention.
FIG. 9B shows a schematic longitudinal cross-sectional view of one embodiment of the composite image of FIG. 9A after performing an image-based gating procedure, according to the invention.

FIG. 9A shows a schematic longitudinal cross-sectional view of one embodiment of a composite image 900 of a portion of a blood vessel 902 imaged using an intravascular ultrasound imaging system before employing an image-based gating procedure. FIG. 9B shows a schematic longitudinal cross-sectional view of one embodiment of a composite image 920 of the portion of the blood vessel 902 after employing an image-based gating procedure. The blood vessel 902 includes a lumen 904 and an adventitia 906 having an inner border 908. A comparison of the composite images 900 and 920 in FIGS. 9A and 9B, respectively, reveals that the image-based gating procedure reduces artifacts that may be present in the composite image 900 of the blood vessel 902 and that may make structures within the image 900 less visible. For example, the inner border 908 of the adventitia 906 is more visible in FIG. 9B than in FIG. 9A. The improved visibility of the inner border 908 of the adventitia 906 may be due to the removal of artifacts through the image-based gating procedure.

Figure 10:
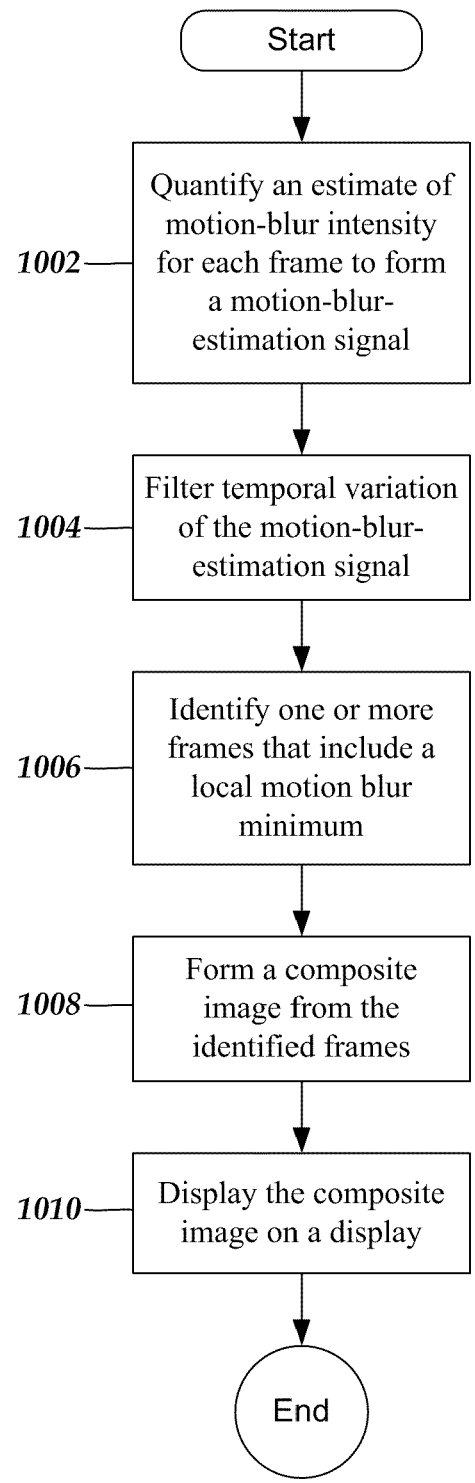
FIG. 10 is a flow diagram showing one exemplary embodiment of an image-based gating procedure for reducing motion-related artifacts in a composite image formed during an intravascular imaging procedure, according to the invention.

FIG. 10 is a flow diagram showing one exemplary embodiment of an image-based gating procedure for reducing artifacts in a composite image formed during an intravascular imaging procedure through motion blur analyses of individual frames of the composite image. In step 1002, an estimate of motion-blur intensity for each frame is quantified and formed into a motion-blur-estimation signal. In at least some embodiments, the motion-blur-estimation signal varies over time. In at least some embodiments, the motion-blur-estimation signal includes periodic local motion blur minima that correspond to the patient's cardiac cycle. In at least some embodiments, the motion-blur-estimation signal includes motion blur caused by vessel structure variation. In step 1004, temporal variation of the motion-blur-estimation signal is filtered. In at least some embodiments, the motion-blur-estimation signal is filtered to reduce variation in the motion-blur-estimation signal arising from vessel structure variation. In step 1006, one or more frames are selected that include local motion blur minima. In at least some embodiments, one or more frames are selected from within each cardiac cycle. In step 1008, a composite image is formed from the identified frames within each cardiac cycle that include local blur minima. In step 1010, the composite image is displayed on a display.

It will be understood that each block of the flowchart illustrations, and combinations of blocks in the flowchart illustrations, as well any portion of the tissue classifier, imager, control module, systems and methods disclosed herein, can be implemented by computer program instructions. These program instructions may be provided to a processor to produce a machine, such that the instructions, which execute on the processor, create means for implementing the actions specified in the flowchart block or blocks or described for the tissue classifier, imager, control module, systems and methods disclosed herein. The computer program instructions may be executed by a processor to cause a series of operational steps to be performed by the processor to produce a computer implemented process. The computer program instructions may also cause at least some of the operational steps to be performed in parallel. Moreover, some of the steps may also be performed across more than one processor, such as might arise in a multi-processor computer system. In addition, one or more processes may also be performed concurrently with other processes, or even in a different sequence than illustrated without departing from the scope or spirit of the invention.

The computer program instructions can be stored on any suitable computer-readable medium including, but not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computing device.

It will be understood that pullback along one or more of the survey region or the ROI may be performed by pulling the imager from a distal end to a proximal end of the region being imaged. It will also be understood that the intravascular imaging techniques described above can also be used with other types of imaging techniques that use a catheter insertable into patient vasculature. For example, the intravascular imaging techniques can be used with any imaging techniques configured and arranged to assess one or more measurable characteristics of patient tissue (e.g., optical coherence tomography, intravascular magnetic resonance imaging, spectroscopy, temperature mapping, or the like).

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A method for imaging a patient using an intravascular ultrasound imaging system, the method comprising:
   inserting a catheter into a target imaging region within patient vasculature, the catheter comprising at least one transducer disposed in a distal portion of a lumen defined in the catheter, the at least one transducer coupled to a control module by at least one conductor;
   generating a plurality of image frames as the at least one transducer is moved within patient vasculature, the image frames are based on data obtained from a plurality of echo signals reflected from patient tissue in response to a plurality of acoustic signals output from the at least one transducer, wherein each image frame comprises a motion-blur component arising from relative movement between the at least one transducer and surrounding patient tissue;
   quantifying a motion-blur-intensity estimate for each image frame to form a motion-blur-estimation signal that varies over time and that includes periodic local motion blur minima;
   filtering temporal variation of the motion-blur components to reduce variation in the motion-blur-intensity estimate arising from vessel structure variation; and
   selecting image frames that contain local motion blur minima.

2. The method of claim 1, further comprising forming at least one composite image using the selected image frames that contain local motion blur minima.

3. The method of claim 2, further comprising displaying the at least one composite image on a coupled display.

4. The method of claim 1, wherein generating the plurality of image frames as the at least one transducer is moved within patient vasculature comprises generating the plurality of image frames during pullback of the at least one transducer within patient vasculature.

5. The method of claim 4, wherein generating the plurality of image frames during pullback of the at least one transducer within patient vasculature comprises generating the plurality of image frames during pullback at a constant rate of speed.

6. The method of claim 4, wherein generating the plurality of image frames as the at least one transducer is moved within patient vasculature, wherein each image frame comprises the motion-blur component arising from relative movement between the at least one transducer and surrounding patient tissue comprises generating the plurality of image frames as the at least one transducer is moved within patient vasculature, wherein each image frame comprises a motion-blur component corresponding to the patient's cardiac cycle.

7. The method of claim 6, wherein quantifying the motion-blur-intensity estimate for each image frame to form the motion-blur-estimation signal that varies over time and that includes periodic local motion blur minima comprises quantifying the motion-blur-intensity estimate for each image frame to form the motion-blur-estimation signal that varies over time and that includes periodic local motion blur minima that correspond to the patient's cardiac cycle, as well as motion blur minima related to pullback of the at least one transducer.

8. The method of claim 1, wherein quantifying the motion-blur-intensity estimate for each image frame to form the motion-blur-estimation signal that varies over time and that includes periodic local motion blur minima comprises quantifying the motion-blur-intensity estimate for each image frame to form the motion-blur-estimation signal by computing an average gradient magnitude for each of the image frames.

9. The method of claim 1, wherein filtering the temporal variation of the motion-blur components comprises filtering the temporal variation of the motion-blur components using a high-pass filter.

10. The method of claim 9, wherein filtering the temporal variation of the motion-blur components using the high-pass filter comprises filtering the temporal variation of the motion-blur components using a high-pass filter with a cut-off frequency of at least 0.5 Hz.

11. The method of claim 1, wherein filtering the temporal variation of the motion-blur components comprises filtering the temporal variation of the motion-blur components using a band-pass filter.

12. A non-transitory computer-readable medium having processor-executable instructions for reducing image artifacts present in a composite intravascular ultrasound image formed from a plurality of image frames by selectively using image frames with relatively low amounts of motion blur, the processor-executable instructions when installed onto a device enable the device to perform actions, comprising:
   generating a plurality of image frames as the at least one transducer is moved within patient vasculature, the image frames are based on data obtained from a plurality of echo signals reflected from patient tissue in response to a plurality of acoustic signals output from the at least one transducer, wherein each image frame comprises a motion-blur component arising from relative movement between the at least one transducer and surrounding patient tissue;
   quantifying a motion-blur-intensity estimate for each image frame to form a motion-blur-estimation signal that varies over time and that includes periodic local motion blur minima;

filtering temporal variation of the motion-blur components to reduce variation in the motion-blur-intensity estimate arising from vessel structure variation; and selecting image frames that contain local motion blur minima.

13. The non-transitory computer-readable medium of claim 12, wherein the processor-executable instructions when installed onto a device further enable forming at least one composite image using the selected at least one image frame within each of the patient's cardiac cycles that contains a local motion blur minimum.

14. The non-transitory computer-readable medium of claim 12, wherein the processor-executable instructions when installed onto a device further enable displaying the at least one composite image on a coupled display.

15. A catheter-based intravascular ultrasound imaging system comprising:
at least one imager disposed in a catheter at least partially insertable into a patient blood vessel, the at least one imager coupled to a control module; and
a processor in communication with the control module, the processor for executing processor-readable instructions that enable actions, including:
generating a plurality of image frames as the at least one imager is moved within patient vasculature, the image frames are based on data obtained from a plurality of echo signals reflected from patient tissue in response to a plurality of acoustic signals output from the at least one imager, wherein each image frame comprises a motion-blur component arising from relative movement between the at least one imager and surrounding patient tissue;
quantifying a motion-blur-intensity estimate for each image frame to form a motion-blur-estimation signal that varies over time and that includes periodic local motion blur minima;
filtering temporal variation of the motion-blur components to reduce variation in the motion-blur-intensity estimate arising from vessel structure variation; and
selecting image frames that contain local motion blur minima.

16. The catheter-based intravascular ultrasound imaging system of claim 15, wherein the processor for executing processor-readable instructions further enables forming at least one composite image using a set of the at least one image frame with the local motion blur minima occurring within each of the patient's cardiac cycle.

17. The catheter-based intravascular ultrasound imaging system of claim 15, wherein the processor for executing processor-readable instructions further enables displaying the at least one composite image on a coupled display.

18. The catheter-based intravascular ultrasound imaging system of claim 15, wherein generating the plurality of image frames as the at least one transducer is moved within patient vasculature comprises generating the plurality of image frames during pullback of the at least one transducer within patient vasculature.

19. The catheter-based intravascular ultrasound imaging system of claim 18, wherein generating the plurality of image frames as the at least one transducer is moved within patient vasculature, wherein each image frame comprises the motion-blur component arising from relative movement between the at least one transducer and surrounding patient tissue comprises generating the plurality of image frames as the at least one transducer is moved within patient vasculature, wherein each image frame comprises a motion-blur component corresponding to the patient's cardiac cycle.

20. The catheter-based intravascular ultrasound imaging system of claim 19, wherein quantifying the motion-blur-intensity estimate for each image frame to form the motion-blur-estimation signal that varies over time and that includes periodic local motion blur minima comprises quantifying the motion-blur-intensity estimate for each image frame to form the motion-blur-estimation signal that varies over time and that includes periodic local motion blur minima that correspond to the patient's cardiac cycle, as well as motion blur minima related to pullback of the at least one transducer.

* * * * *